(12) United States Patent
Fanning

(10) Patent No.: US 6,625,695 B2
(45) Date of Patent: *Sep. 23, 2003

(54) CACHE LINE REPLACEMENT POLICY ENHANCEMENT TO AVOID MEMORY PAGE THRASHING

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/319,738

(22) Filed: Dec. 13, 2002

(65) Prior Publication Data

US 2003/0093644 A1 May 15, 2003

Related U.S. Application Data

(63) Continuation of application No. 09/675,765, filed on Sep. 29, 2000, now Pat. No. 6,523,092.

(51) Int. Cl.$^7$ ................................................ G06F 12/00
(52) U.S. Cl. ...................................... 711/134; 711/133
(58) Field of Search ................................ 711/133, 134, 711/136

(56) References Cited

U.S. PATENT DOCUMENTS

| 5,442,571 | A | 8/1995 | Sites |
| 5,630,097 | A | 5/1997 | Orbits et al. |
| 5,752,069 | A | 5/1998 | Roberts et al. |
| 5,752,261 | A | 5/1998 | Cochcroft, Jr. |
| 6,434,671 | B2 | 8/2002 | Chung |

OTHER PUBLICATIONS

United States Patent Application Publication, "Chung", Publication Date Aug. 2, 2001 US 2001/0011328 A1.

United States Patent Application Publication, "Morikawa et al.", Publication Date Oct. 18, 2001 US 2001/0032297 A1.

United States Patent Application Publication, "Chauvel et al.", Publication Date May 30, 2002 US 2002/0065992 A1.

*Primary Examiner*—Kevin Verbrugge
(74) *Attorney, Agent, or Firm*—Peter Lam

(57) ABSTRACT

A method for a cache line replacement policy enhancement to avoid memory page thrashing. The method of one embodiment comprises comparing a memory request address with cache tags to determine if any cache entry in set 'n' can match the address. The address is masked to determine if a thrash condition exists. Allocation to set 'n' is discouraged if a thrash condition is present.

20 Claims, 5 Drawing Sheets

CACHE LINE REPLACEMENT POLICY ENHANCEMENT TO AVOID MEMORY PAGE THRASHING

This patent application is a Continuation of U.S. patent application Ser. No. 09/675,765, entitled "Cache Line Replacement Policy Enhancement To Avoid Memory Page Thrashing", filed Sep. 29, 2000 now U.S. Pat. No. 6,523,092.

FIELD OF THE INVENTION

The present invention relates generally to the field of computers and computer systems. More particularly, the present invention relates to a cache line replacement policy to avoid memory page thrashing.

BACKGROUND OF THE INVENTION

Since the beginning of computing, processors have been faster than memories. Even though memory technology has evolved and improved over time, so has processor technology. What this means is that processors often have to remain idle for substantial amounts of time while waiting for the memory to respond to a memory request. As a result, system performance can be negatively impacted.

Computer systems have evolved to include memory hierarchies comprising various types of long term storage, main memory, and caches. However, as one moves down the down the memory hierarchy from caches to long term storage, device access times increase dramatically. An ideal solution is to have enough cache memory or fast main memory available to service the currently executing program. But in most systems, such memory is present in only limited amounts or the program demands more memory than is available.

Caches are generally used to keep often used or recently used data close to or within the processor. The idea is that by storing recently used data in close proximity to the processor, the next time a memory request is made for that particular data, a long memory access to main memory or the hard disk drive is not necessary. When a computer starts up, the cache is empty. But over time, the cache continues to fill up until there are no longer any empty entries for new data. This is not a problem as long as invalid entries are available for replacement. But if all existing entries are valid, the cache replacement logic must delete valid entries to make room for incoming data.

In an efficiently designed computer system, the chipset needs to return requested data to the processor with minimum latency in order to provide maximum system performance. A number of factors can influence this latency, including overall system loading and the memory technology deployed. One factor that can become significant is the specific interaction between transactions that are closely related by the time that they are issued to the processor bus. When these transactions cause a conflict or "page miss" in the memory system, read latency seen by the processor can increase dramatically. The impact of these conflicts is often minimized by the inherent randomness of transaction requests. However, certain application access patterns can cause pathological cases where every access is impacted by these page miss cases.

Some of these conflicts are inevitable, as operating system, application, and chipset design details can interact in ways to create vicious cases. On the other hand, a substantial class of conflicts can arise simply from an interaction between the way in which memory controllers are designed and the way in which processor caches are designed. These conflicts can have a significant impact on processor and overall system performance.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for a cache line replacement policy enhancement to avoid memory page thrashing is disclosed. The embodiments described herein are described in the context of a microprocessor, but are not so limited. Although the following embodiments are described with reference to processors, other embodiments are applicable to other integrated circuits or logic devices. The same techniques and teachings of the present invention can easily be applied to other types of circuits or semiconductor devices that use caches or memory.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Figure 1:
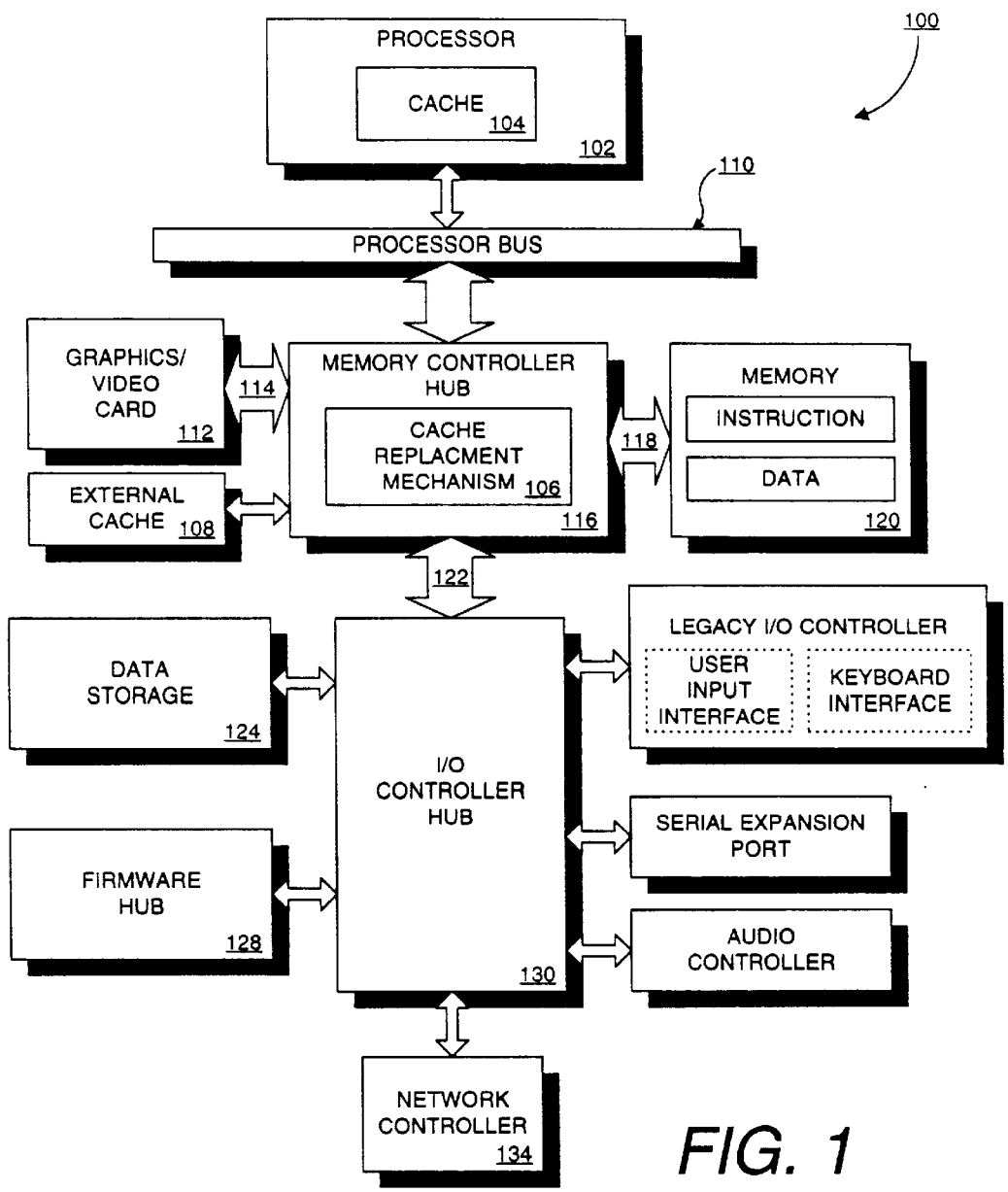
FIG. 1 is a block diagram of one embodiment of a system employing a cache line replacement policy enhancement to avoid memory page thrashing.

Referring now to FIG. 1, a computer system 100 is shown. System 100 includes a component, such as a memory controller hub 116, employing a cache replacement mechanism 106 in accordance with the present invention, such as in the embodiment described herein. System 100 is representative of processing systems based on the Intel PENTIUM® Pro, PENTIUM II, PENTIUM III, Itanium® microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory such as external cache 108 can reside external to the processor.

A system logic chip 116 is coupled to the processor bus 110 and memory 120. The system logic chip 116 in the illustrated embodiment is a memory controller hub (MCH). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

A cache replacement mechanism 106 to avoid memory page thrashing also resides in MCH 116. Alternate embodiments of a cache replacement mechanism 106 can also be used in microcontrollers, embedded processors, graphics devices, DSPs, and other types of logic circuits.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses a latch type mechanism for other embodiments.

Processor caches most often are arranged so that the lower bits of a request address are used to index into the memory array and the upper bits are compared against a cache tag to determine the relevance of the data in the cache to the request being offered. As a result, requests whose addresses differ only in these upper bits are assigned to the same line of the cache array, since the lower bits are used as the index. Because this behavior can cause inefficient use of the cache, many caches are divided into a number of smaller sets. These sets diffuse the effect of pathological address patterns by creating several locations where a given request can be stored, thus dramatically reducing the probability of an addressing pathology. In such multi-set (or multi-way) caching implementations, requests whose addresses miss the cache are typically assigned to a cache set on a least-recently-used, least-recently-allocated, or random basis.

One form of a cache that is often used is known as a write-back cache. In a write-back cache implementation, write operations offered by the processor core are retained in the cache and written back to memory only when the cache line needs to be recycled in order to service another cache transaction.

Figure 2:
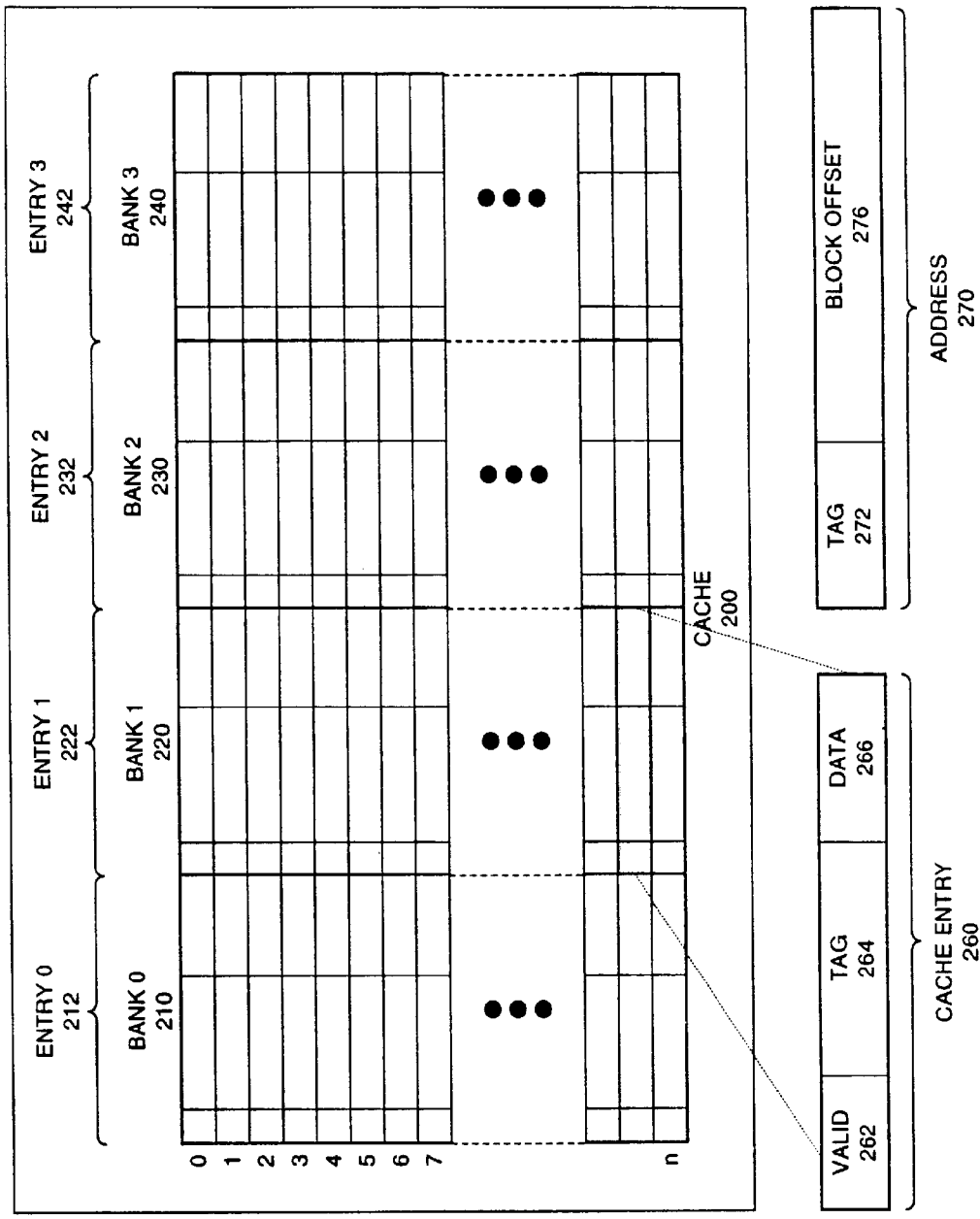
FIG. 2 is a block diagram of a cache memory to employ one embodiment of the present invention.

FIG. 2 is a block diagram of a cache memory 200 to employ one embodiment of the present invention. The cache memory 200 of FIG. 2 is four-way set associative with 'n' sets. Each of the 'n' sets consists of four separate entries. Cache 200 comprises of Bank 0 210, Bank 1 220, Bank 2 230, and Bank 3 240. Each bank provides a block to store an entry for each set. For example, Bank 0 210 stores Entry 0 212, Bank 1 220 stores Entry 1 222, Bank 2 240 stores Entry 2 242, and Bank 3 260 stores Entry 3 262.

When a memory access occurs, the cache logic receives a memory address 270. The address 270 is divided into two fields: tag 272 and block offset 276. The value in the tag field 272 is used to compare with the tags in a set when searching for a match. The block offset field 276 is used to select the desired data from the entry.

Each cache entry 260 comprises of three fields: valid 262, tag 264, and data 266. The valid field 262 indicates whether the present entry is currently in use or not. The tag field 264 contains part of the address 270 and is used during a cache search to determine whether an entry is the one desired. The data field 266 contains the data for this entry.

During a memory access, the cache logic parses address 270 into the separate fields 272 and 276. Each tag 272 is compared with the tag 264 of each valid entry in all sets of the cache. If a match is found, then the data 266 is sent to the processor. But if no match is found, then the cache 200 does not have the desired data. After the data is retrieved from main memory, the data will also be stored into the cache 200 for future reference. If one or more of the cache sets contains an invalid/empty entry at the location pointed to by the block offset 276, then the data is simply stored in that set. But if all the sets have valid data at the location indicated by the block offset 276, then the cache replacement policy determines which of the entries to discard. Two strategies are that are often used in cache replacement algorithms are: (1) random and (2) least recently used (LRU). To spread allocation uniformly, candidate entries are randomly selected in the random strategy. The LRU strategy attempts to reduce the chance of throwing out information that will be needed soon and records the accesses made to each entry. The set selected for replacement is the one that contains data that has been unused for the longest time.

However, if the data at a given block offset in all of the sets is repeatedly used, then frequent replacements may happen. For instance, in the four-way set associate of this example, there are four cache sets. But if there are more than four addresses that are repeatedly accessed and the data are all stored at the same block offset, then the cache will continually swap the entries of that block offset in and out.

In a chipset memory controller, memory is typically divided into a number of banks. The particular number of memory banks deployed in any platform depends on factors such as the DRAM technology used and the number of devices populating the system. With a single dual in-line memory module (DIMM) of synchronous DRAM (SDRAM) for example, a computer system can have as few as four banks. In a fully populated Rambus DRAM (RDRAM) memory subsystem, the chipset can control about a thousand banks. The size of a bank is equal to the size of the memory system divided by the number of banks in the memory system. These banks are further subdivided into a number of pages that can range in size from 1 kilobyte (Kbyte) to 64 Kbyte.

When an access to a particular bank maps to a different page than the previous access to that bank, a page miss occurs. The memory controller must retire the data that is currently loaded into the page array back into the memory core in order to make room in the page array for the new data. The latency of this operation in typical DRAM subsystems today is around 30 or 40 nanoseconds (ns). Since a typical DRAM access is currently around 100 ns, this page miss can impact the latency of a particular transaction by up to 40%.

For an RDRAM based system, some designers have found that a 64 megabit device with 16 banks is optimally accessed when system addresses that differ by 32 Kbyte fall within the same bank. The derivation for this value is simple. Generally, mapping consecutive memory pages to separate banks is better because the locality inside of an application's memory access stream would not imply adverse paging behavior. A memory device with 16 banks and 2 Kbyte pages would simply map addresses sequentially through the banks one page at a time.

Figures 3A, 3B:
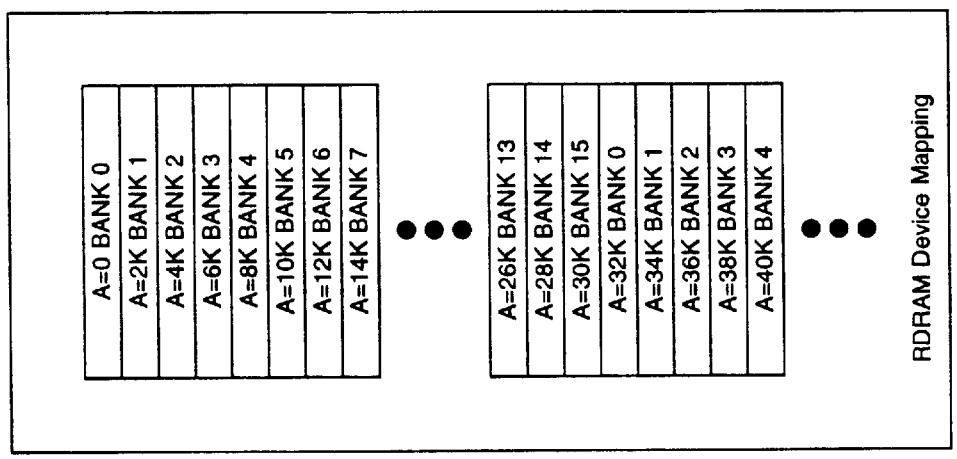
FIG. 3A illustrates the banking of a RDRAM memory device.
FIG. 3B illustrates a four-way set associative 128 Kbyte cache.

FIG. 3A illustrates the banking of a RDRAM memory device. The memory device of this example comprises of sixteen banks numbering from 0 to 15. The banks are further subdivided into pages of 2 Kbyte size. An extremely large number of pages can exist for systems with a large amount of memory space. These pages are sequentially addressed across the sixteen banks. For instance, Page 0 having starting address 0 is in Bank 0, Page 1 having starting address 2K in Bank 1, Page 2 having starting address 4K in Bank 2, and so on. Bank 15 has starting address 30K and maps to Page 15, but then the pages wrap around back to Bank 0 such that Page 16 having starting address 32K is in Bank 0. This paging arrangement continues for the rest of the memory space.

During operation, the memory controller may only have one page open for each bank in memory. This opened page can be accessed for reads and writes. For example, Page 0 of Bank 0 can be presently open. But if the processor is now accessing Page 16, which also resides in Bank 0 for this example, the memory controller needs to close Page 0 and then open up Page 16. This process repeats whenever an access is performed to a page other than the presently opened page of that particular bank. Hence, repeated accesses to various pages within the same bank can cause memory thrashing to occur. Thrashing can have a negative impact on processor and system performance as the memory controller requires time to close pages, open pages, and access pages.

The memory controller maintains the openness, or state of pages. Only one page per bank can be opened at any one time. A page miss is defined as an attempt to access a page that is not presently open. When a page miss occurs, the memory controller has to open the desired page. If that particular bank already has an opened page, that page has to be closed first before the new page is opened. For a page read, the memory controller typically opens a page, accesses the data, and leaves the page open. A page hit occurs when the memory access is to an already open page and the memory controller does not have to perform a open/close step. Page empty occurs when the memory access is to page in a bank does not have any presently open page. The memory controller simply opens the page without performing a close page.

When a pathological pattern, such as a stream of writes or the data accesses is applied to a processor cache and chipset memory controller combination, the regularity of the accesses combined with the LRU line allocation policy can cause worst case memory behavior. Many of these patterns can be detected and defeated through a modification to the cache's LRU policy. One such modification detects likely page-thrashing conditions between reads and writeback data, and modifies the line allocation policy in response.

For example, take the case of a 128 Kbyte processor cache that is divided into four sets. FIG. 3B illustrates a four-way set associative 128 Kbyte cache. Each set can store 32 Kbyte of data. Each cache line is in this case 32 bytes wide, although other line sizes are possible in other embodiments. If the cache is empty and clean at initialization, the application of a 256 Kbyte write stream to the cache would first cause 128 Kbyte of read/invalidate operations. These read/invalidate or read-for-ownership (RFO) operations serve to acquire ownership of the cache lines for the requesting agent. After these first RFO operations, however, an undesirable behavior would begin in the cache. The accesses that attempt to write to the cache beginning at 128 Kbyte would cause an RFO operation from system address 128K. This RFO operation would be followed by a writeback operation to system address 0.

In a minimal SDRAM system that employs four 64 megabit SDRAM devices, addresses could map into the memory devices in such a way that accesses to pages separated by 64 Kbyte would address the same memory bank. As a result, both accesses, the write to 128K and the writeback at 0, would be to the same memory device. In fact, because of the system address-to-device bank mapping discussed earlier, both accesses would be to the same bank. This causes a page miss for the write operation. The memory controller needs to close the memory page that is currently open in that bank and then open up the 128K page. The next system transaction to be presented is likely be an RFO operation from 128k+32 byte. This would again cause a page miss to occur because the last address was to the same device in the same bank. These page misses would continue through the entire 128 Kbyte of the cache, causing worst-case behavior the whole time. Note that for this example, the read data for the 128K address is destined for set 0 in the cache because of the LRU algorithm. Note also that the dirty data in Sets 1 and 3 would not conflict with the address stream. If the page thrash condition can be detected before the processor decides which set's line should be replaced, then the pathological behavior described can be avoided by the cache controller if the controller allocates the replacement line from Set 1 or Set 3 instead. There are no interesting boundary cases where all lines would cause page conflicts since correctness is not compromised by the failure of this mechanism. If all the sets have conflicts and are discouraged, then the cache controller can simply revert to the default cache entry replacement scheme such as LRU.

In order to detect the thrash condition, the cache controller requires information about the paging behavior of the memory subsystem. Sometimes this information can be complex, as in the case where several different memory technologies are populated in the same platform. The present invention provides a mask that the cache controller can use to drive its decisions about page conflicts.

Figure 4:
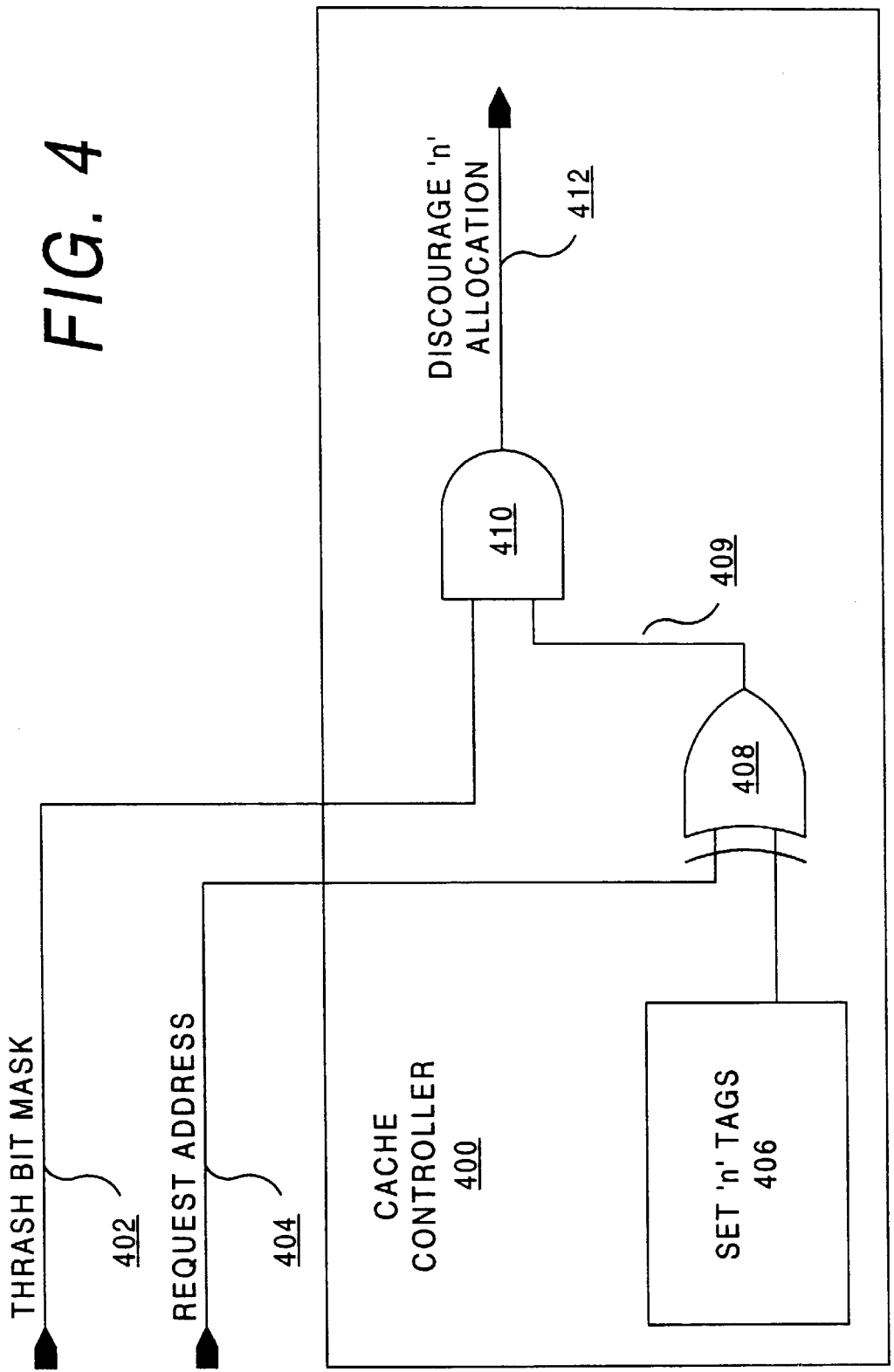
FIG. 4 is a schematic diagram of a thrash condition detector.

FIG. 4 is a schematic diagram of a thrash condition detector. Cache controller 400 receives input signals THRASH BIT MASK 402 and REQUEST ADDRESS 404. THRASH BIT MASK 402 is a set of address mask signals coupled to AND gate 410 to detect the thrash condition. The mask 402 ensures that only the necessary bits of the addresses are tested. The particular configuration of the mask can be affected by the memory device type, device size, and bank size. REQUEST ADDRESS 404 is the address of the current memory access. SET 'n' TAGS 406 are the cache tags of Set 'n' to which the new data is to be stored. For this example, REQUEST ADDRESS 404 and each tag of SET 'n' TAGS 406 both comprise of thirty two bits each.

Exclusive OR gates 408 receives REQUEST ADDRESS 404 and SET 'n' TAGS. Exclusive OR gates 408 compares the inputs and generates a hit or miss result 409. The exclusive OR result 409 is gated by the THRASH BIT MASK 402 at AND gate 410. The detection result of the mask bits 402 and the tag comparison 409 is delivered at the AND gate 410 output as the DISCOURAGE 'n' ALLOCATION signal 412. If the DISCOURAGE 'n' ALLOCATION signal 412 is active, meaning that a page conflict may occur in the present set, then the cache controller 400 can attempt to allocate the replacement line from another set instead.

Embodiments of this mask can be used in the controller to determine whether a dirty entry is likely to conflict with the current request. If a possible conflict is detected and another set has a clean entry or a non-conflicting dirty entry, then that other set's entry is allocated instead. For the example above, the mask would consist of the bits that "bound" the conflicting addresses' ranges. Since accesses separated by 64 Kbyte cause page conflicts, but 32 Kbyte separations do not, bit 16 of the mask should be set while bit 15 remains clear. The mask starts with bit 0 as the right most bit. Furthermore, since a row of SDRAM implemented with four 64 megabit devices provides 32 megabytes of storage, accesses to addresses above 32 megabyte would be to a different device and would necessarily not conflict with accesses to this device. The bit mask derived from these conditions needs to include bit 16, bit 24, and all bits in between in order for the cache controller to have enough information to avoid page conflicts. Therefore, the mask for this example would be 0x01FF0000 in hex.

If 64 megabit RDRAM devices were used instead, the upper limit would be driven by the 8 megabyte boundary to bit 22, while the lower limit would dip to bit 15, as driven by 32 Kbyte separations. The mask implied by these bounds is 0x007F8000.

The mask can be stored in the system BIOS or chipset and loaded into the processor during system startup. If the processor reads this mask at startup and stores the mask internally, then the mask can be provided to the cache controllers to filter cache request addresses and to discourage allocation of a line on a case-by-case basis.

Embodiments of this invention can be used to enhance processor/platform performance on benchmarks that involve long streams of read and write data, such as STREAMS and SpecFP.

Figure 5:
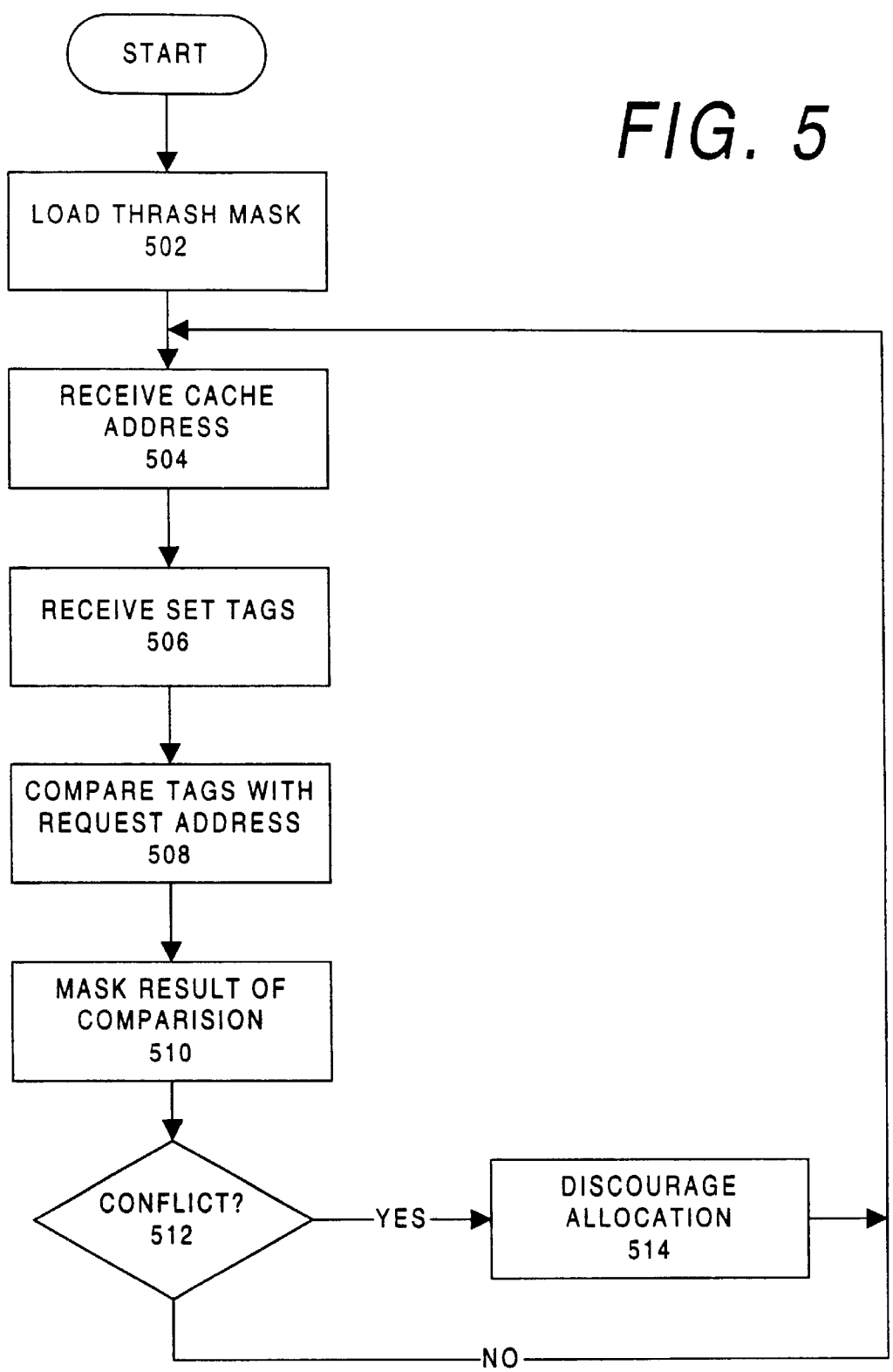
FIG. 5 is a flow diagram for the method of one embodiment.

FIG. 5 is a flow diagram for the method of one embodiment. At step 502, the thrash mask is loaded into the cache controller. The address of the memory request is also received at the controller at step 504. The tags for the set 'n' that can fulfill the memory request are received at the controller at step 506. At step 508, the set 'n' tags are compared with the memory request address to determine if there is a cache hit. If there is a miss, the address is masked at step 510 to determine if a conflict can happen. If the controller at step 512 determines that a conflict will not occur, then the check is complete. But if a conflict is possible, then allocation to that set is discouraged at step 514. The process continues indefinitely every time a new memory address is received at step 504.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
   receiving a memory address, said memory address comprising a tag portion and a block offset portion;
   comparing said tag portion of said memory address with at least one tag for a first cache entry of a first set of a N-way set associative cache to determine if a cache miss exists, said cache miss to indicate a possible conflict for said first set;
   outputting said memory address for masking with a thrash mask if said cache miss exists, said thrash mask comprising of address bits that bound a range of possible conflicting addresses;
   evaluating said memory address with said thrash mask to determine if a page conflict is possible; and
   discouraging allocation of any cache entry in said first set for said memory address if said page conflict is possible.

2. The method of claim 1 wherein said discouraging allocation is communicated with a discourage allocation signal for said first set.

3. The method of claim 2 wherein N-way set associative cache is a four way set associative cache.

4. The method of claim 3 wherein each set of said N-way set associative cache is checked for possible page conflicts.

5. The method of claim 4 wherein said first cache entry comprises a cache line capable of storing data for said memory address.

6. The method of claim 5 further comprising attempt to store said data for said memory address in another set of said N-way set associative cache.

7. The method of claim 6 wherein a default cache replacement scheme is implemented if allocation is discouraged at all sets of said N-way set associative cache.

8. The method of claim 7 wherein said default cache replacement scheme is a least recently used scheme.

9. An apparatus comprising:
   an N-way set associative cache memory to store data in a plurality of cache entries;
   a match circuit coupled to said N-way set associative cache memory to receive a memory address having a tag portion and a block offset portion, said match circuit to compare said tag portion with a first tag for a first cache entry of a first set of said N-way set associative cache in order to determine whether a cache miss exists;

a mask circuit coupled to said match circuit, said mask circuit to receive said memory address and to mask said memory address with a thrash mask if said cache miss exists, said thrash mask comprising of address bits that bound a range of possibly conflicting addresses; and an output signal to responsive to an evaluation of said memory address and said thrash mask, said output signal to discourage allocation of said first cache entry in said first set if a page conflict is possible.

10. The apparatus of claim 9 further comprising a memory location coupled to said mask circuit to store said thrash mask and to provide said thrash mask to said mask circuit.

11. The apparatus of claim 10 wherein said memory address is communicated from a processor coupled to said N-way set associative cache memory and said match circuit.

12. The apparatus of claim 11 wherein said apparatus is a processor.

13. The apparatus of claim 11 wherein said first cache entry comprises a cache line capable of storing data for said memory address.

14. The apparatus of claim 13 wherein each set of said N-way set associative cache memory is checked for possible page conflicts.

15. The apparatus of claim 14 wherein said plurality of cache entries are replaced through a least recently used scheme if possible page conflicts exists in all sets of said N-way set associative cache memory.

16. A system comprising:

a processor including an N-way set associative cache memory to store a plurality of cache entries;

a memory coupled to said cache memory to provide data to said processor;

a cache controller coupled to said cache memory, said cache controller comprising:

a match circuit coupled to said N-way set associative cache memory to receive a memory address having a tag portion and a block offset portion, said match circuit to compare said tag portion with a first tag for a first cache entry of a first set of said N-way set associative cache in order to determine whether a cache miss exists;

a mask circuit coupled to said match circuit, said mask circuit to receive said memory address and to mask said memory address with a thrash mask if said cache miss exists, said thrash mask comprising of address bits that bound a range of possibly conflicting addresses; and an output signal to responsive to an evaluation of said memory address and said thrash mask, said output signal to discourage allocation of said first cache entry in said first set if a page conflict is possible.

17. The system of claim 16 wherein said system further comprises a memory location coupled to said mask circuit to store said thrash mask and to supply said thrash mask to said mask circuit.

18. The system of claim 17 wherein said memory address is communicated from said processor to said N-way set associative cache memory and said match circuit.

19. The system of claim 18 wherein said first cache entry comprises a cache line capable of storing data for said memory address.

20. The system of claim 19 wherein each set of said N-way set associative cache memory is checked for possible page conflicts and wherein said plurality of cache entries are replaced through a least recently used scheme if possible page conflicts exists in all sets of said N-way set associative cache memory.

* * * * *